United States Patent [19]
Golio et al.

[11] Patent Number: 5,590,063
[45] Date of Patent: Dec. 31, 1996

[54] OPTIMIZATION METHOD USING PARALLEL PROCESSORS

[75] Inventors: John M. Golio, Chandler; Robert C. Turner, Mesa; Monte G. Miller, Phoenix; David J. Halchin, Chandler, all of Ariz.

[73] Assignee: Motorola, Inc., Schaumburg, Ill.

[21] Appl. No.: 270,948

[22] Filed: Jul. 5, 1994

[51] Int. Cl.$^6$ ................................................. G06F 17/00
[52] U.S. Cl. .............................. 364/580; 364/488; 395/50
[58] Field of Search .................................. 364/580, 488, 364/164, 492, 402; 395/50, 24, 200, 325, 200.19

[56] References Cited

U.S. PATENT DOCUMENTS

| | | | |
|---|---|---|---|
| 4,811,210 | 3/1989 | McAulay | 395/325 |
| 4,924,386 | 5/1990 | Freedman et al. | 364/402 |
| 5,043,929 | 8/1991 | Kramer et al. | 364/578 |
| 5,072,371 | 12/1991 | Benner et al. | 395/200 |
| 5,144,563 | 9/1992 | Date et al. | 364/488 |
| 5,195,172 | 3/1993 | Elad et al. | 395/50 |
| 5,200,908 | 4/1993 | Date et al. | 364/488 |
| 5,285,395 | 2/1994 | Kamayashi | 364/492 |
| 5,293,455 | 3/1994 | Castelaz | 395/24 |
| 5,347,460 | 9/1994 | Gifford et al. | 364/468 |
| 5,353,207 | 10/1994 | Keeler et al. | 364/164 |

Primary Examiner—Ellis B. Ramirez
Assistant Examiner—Craig Steven Miller
Attorney, Agent, or Firm—Robert D. Atkins; Rennie William Dover

[57] ABSTRACT

A method executed by a computer for performing numerical optimization of arbitrary functions in a computer model using parallel processors (10, 12, 14). The method initializes (20) each processor with an initial estimate of the parameter value to be optimized. The initial estimate is evaluated (22) in each processor to determine a solution. A best estimate of the parameter value from the result in each processor is selected (24), and one or more of the parallel processors with the best estimate is set to run in gradient mode while the remaining processors run in random mode (26). The estimates of the parameter value from the processors running in random mode is evaluated until a local minimum is obtained from the processor running in gradient mode (28). The process is repeated until an optimal solution is found (34).

16 Claims, 2 Drawing Sheets

OPTIMIZATION METHOD USING PARALLEL PROCESSORS

BACKGROUND OF THE INVENTION

The present invention relates in general to the design and manufacture of integrated circuits and, more particularly, to an optimization process using parallel processors.

In the design and simulation of integrated circuits (ICs), a computer model of the device is generally developed to simulate its operation before manufacture. The computer model is a mathematical function describing the device and requires parameters values for a complete quantitative evaluation of its performance. A carefully designed computer model along with optimal parameters provides accurate performance predictions to give designers valuable insight into the final design before fabricating the circuit.

Determining optimal parameters is an important step in building an accurate computer model. The optimization process generally involves searching for an absolute minimum of the function. The optimization process requires a large number of computation iterations of either random trials or gradient steps to home in on the optimal solution, i.e. absolute minimum of the function. Most if not all optimization processes do not suddenly arrive at the best solution, but rather the process is halted after some period of time where no better solutions are found.

Searching for the optimal solution in random mode, i.e. randomly selecting values in the proximity of prior solutions, is computationally fast but may overlook the optimal solution because of the random nature. Prior art optimizers that use a gradient approach tend to be slow because each evaluation requires numerous calculations to take the derivative of the function to finds its slope. A conventional high-speed computer system processing instructions sequentially may involve hundreds of hours to reach a satisfactorily optimized solution in gradient mode. The time requirements become burdensome as the complexity of the function and number of device parameters increase.

Hence, a need exists for a method of finding the optimal solution to an arbitrary function in a more efficient manner.

DETAILED DESCRIPTION OF THE PREFERRED EMBODIMENT

Figure 1:
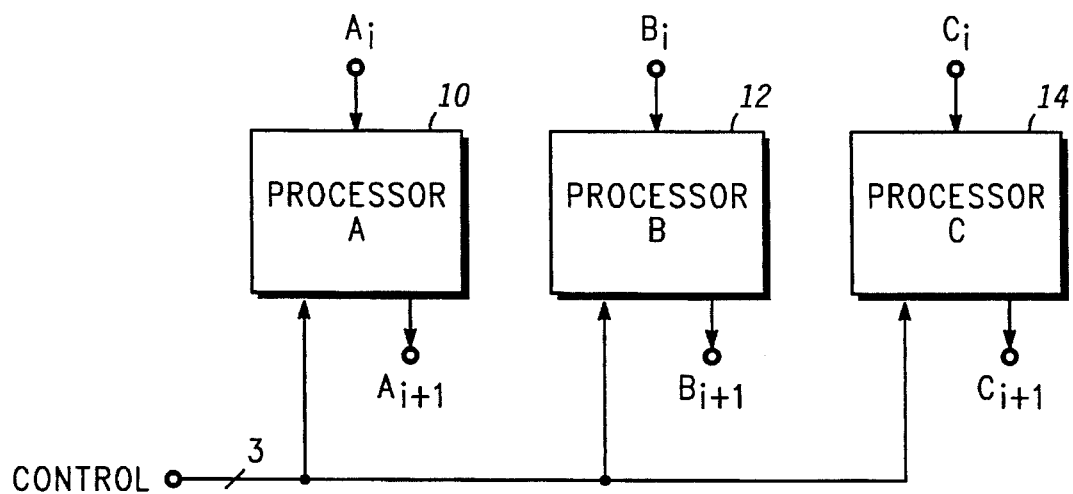
FIG. 1 illustrates multiple parallel processors solving device parameters in a computer model.

Referring to FIG. 1, a plurality of parallel processors 10, 12 and 14 are shown for optimizing device parameter values. An important step in the design of an IC is to develop a computer model of the device and/or circuit that includes a mathematical function describing the device or circuit and parameters values for a complete quantitative evaluation and prediction of its expected performance. For example, the mathematical function may be Ohm's Law applied to each node of the IC while the parameters are the nodal voltages or currents entering each node. The conformance of the computer model to the expectation is quantified by an optimization function goal, i.e. the difference between model and expectation. The optimization process involves searching for an absolute minimum of the function goal. The point where the difference becomes minimum is the optimum value for the device parameter. The absolute minimum gives the best device parameter value to use in the mathematical function that describes the IC under simulation.

The present invention involves the use of parallel processors 10–14 to expedite the search for the optimal device parameter solution. The present invention is applicable to a single machine, multiple parallel processors, or to parallel networked machines each with a single processor. The best available estimates $A_i$, $B_i$ and $C_i$ of the solution are fed into processors 10, 12 and 14, respectively. Processors 10–14 are configured to independently operate in random or gradient mode to find a solution from the best available estimates $A_i$, $B_i$ and $C_i$ for a given arbitrary function. Thus, processors 10, 12 and 14 receive input parameters $A_i$, $B_i$ and $C_i$ and produce solutions $A_{i+1}$, $B_{i+1}$, and $C_{i+1}$, respectively. Control signals independently select whether each processor runs in random mode or gradient mode.

Figure 2:
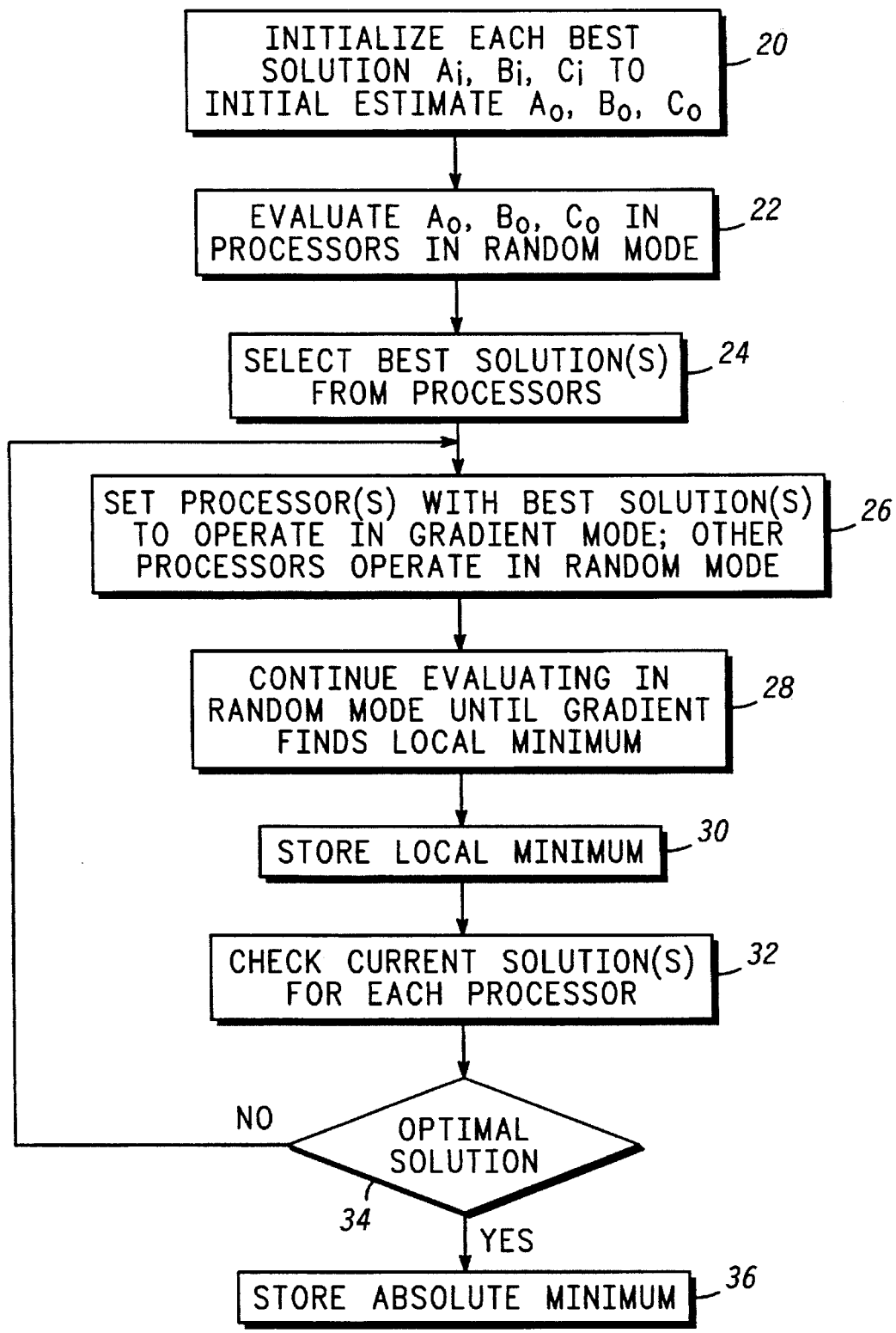
FIG. 2 illustrates steps of optimizing parameter values with the parallel processors.

FIG. 2 describes the steps performed by parallel processors 10–14 to efficiently arrive at the solutions $A_{i+1}$, $B_{i+1}$, and $C_{i+1}$. Step 20 initializes input parameter $A_i$, $B_i$ and $C_i$ to initial estimates $A_0$, $B_0$ and $C_0$, respectively. The initial estimates are selected from the physical characteristics of the parameter, prior experience, and a little common sense. For example, transistor gate lengths generally run between tenths and tens of microns, nodal voltages may operate near one power supply potential, or possibly mid-range of the power supply potentials. When parameters are purely empirical, previous experience can guide the initial estimates. The initial estimate may be set to an average of prior observed minimum and maximum values, taking into account that parameter values in new designs may exceed previous ranges. It is important that each initial estimate $A_0$, $B_0$ and $C_0$ be assigned a different value than the other initial estimates. The initial estimates should span the entire spectrum of possible parameter values for the given function to efficiently search for an optimal solution.

Step 22 evaluates the initial estimates $A_0$, $B_0$ and $C_0$ in processors 10–14 in random mode. That is, processor 10 computes the functional description of the device or circuit with parameter $A_0$ to achieve result $A_1$. Processor 12 computes the functional description of the device or circuit with parameter $B_0$ to achieve result $B_1$ while processor 14 computes the functional description with parameter $C_0$ to achieve result $C_1$.

Figure 3:
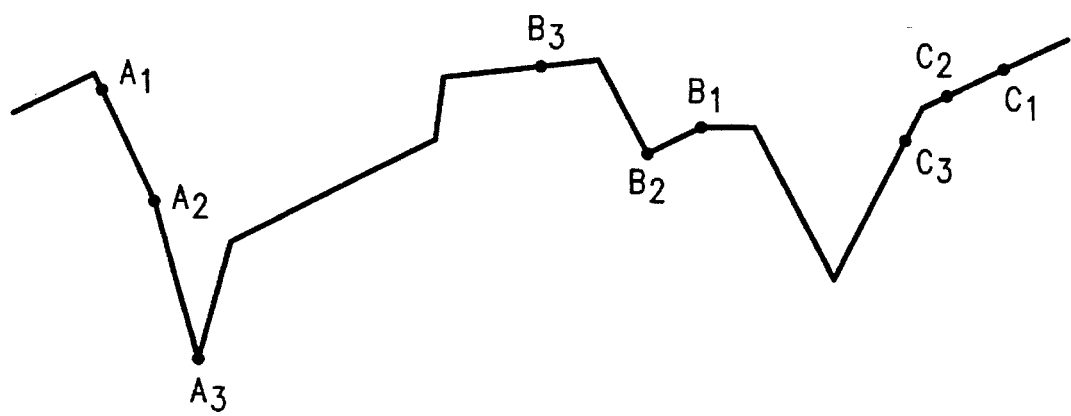
FIG. 3 is a plot useful in the explanation of FIG. 2.

In random mode for each subsequent evaluation, the processors alter present estimates by a random amount, i.e. slight increase or decrease from the previous estimate, and re-evaluate the function. If the new estimate provides a better solution than the previous one, it replaces the old estimate as the most likely solution. If the new estimate does not provide a better solution than the previous one, the old estimate is maintained as the most likely solution and it is again altered by a random amount. The process continues until some criteria for solution is met. There are several known techniques of random optimization such as simulated anneal. One distinguishing feature lies in how the random alterations are performed on the parameters and how the solutions are evaluated to determine the best estimate. Step 22 is repeated a sufficient number of times to get a reasonably good estimate, but not necessarily an optimal solution. Assume step 22 yields estimates $A_1$, $B_1$ and $C_1$ of the function as shown in FIG. 3.

Step 24 selects the best estimate from the processors following step 22. The best estimate is the one with the smallest value since the optimization goal is to find the absolute minimum. For the function shown in FIG. 3, estimate $B_1$ is less than estimates $A_1$ or $C_1$. Step 26 sets the processor(s) with the best estimate, i.e. processor 12, to run in gradient mode while other processor(s), i.e. processors 10 and 14, continue to run in random mode.

In gradient mode, the next estimate of the solution is based on the present estimate and an evaluation or estimate of the function slope or gradient. The slope is determined by taking the derivative at the present estimate to find its slope and moving a predetermined distance from the present estimate in the direction of decreasing function values as determined by the slope. Gradient mode processor 12 continues re-evaluating each subsequent estimate until it finds a local minimum, e.g. estimate $B_2$. A local minimum exists where the derivative is zero and the function increases on both sides. In step 28, processors 10 and 14 continue evaluating in random mode until processor 12 finds the local minimum using gradient mode. After each random mode iteration, processors 10 and 14 check to see if processor 12 has found the local minimum.

In another embodiment, more than one processor may be evaluating in gradient mode depending on the prior solutions. For example, if two processors found similar small values in random mode, both may be set to gradient mode to evaluate and see which one leads to the smallest local minimum.

Processors operating in random mode find solutions much faster than processors operating in gradient mode because of the greater number of calculations necessary for gradient mode solutions. Therefore, as part of the present invention, processors 10 and 14 operate in random mode searching for better solutions while processor 12 having initially found a better solution works in gradient mode to locate its local minimum. The random mode searches are computationally more efficient and allow further evaluations of the function to be made while one or more processors go off in gradient mode to check out a potential optimal solution. The local minimum may end up as the absolute minimum, but that determination cannot be made without further evaluation. Once processor 12 finds the local minimum in step 30, it stores the results in case it is ultimately identified as the absolute minimum.

When processor 12 finds estimate $B_2$ as the local minimum, all processors are checked to see if the random mode operating processor has turned up a better solution than the local minimum found by the gradient mode operating processor. Step 32 checks the present solutions for each processor. Generally, the processor that found the local minimum using gradient mode is forced back to random mode to find an alternative solution.

Step 34 determines whether the optimal solution has been found. The optimal solution is the absolute minimum. An optimal solution is not a clear cut answer but rather a determination that after numerous iterations the present "best" estimate is not getting any smaller than the smallest value stored as a local minimum. An optimal solution is unlikely after one pass so the flow chart returns to step 26 for further evaluations. Steps 26 through 32 are repeated until an optimal solution is identified.

In FIG. 3, estimate $A_2$ found by random mode processing is less than local minimum estimate $B_2$ found by gradient mode processing. Therefore, processor 12 switches back to random mode processing while processor 10 begins a gradient mode search for its local minimum. An estimate is considered worthy of gradient techniques if it is sufficiently close to the solution relative to other estimates under evaluation by other processors but not too close to other estimates that are presently being explored with gradient techniques. The "not too close" test ensures that multiple processors are not trying to find the same minimum with the same approach. Mathematically, "not too close" can be evaluated using the well known "L2 norm" of the vector between two points.

Processors 12 and 14 search for better solutions in random mode until processor 10 finds a local minimum in gradient mode. After processor 10 finds local minimum $A_3$ after one or more gradient mode searches in steps 28 and 30, the present solutions are again checked for optimal solution in steps 32 and 34. Estimate $A_3$ is still less than estimates $B_3$ or $C_3$. After several more loops through steps 26–34, no processor has found a better solution than local minimum $A_3$. In the simplified function of FIG. 3, estimate $A_3$ is the absolute minimum and optimal solution. Step 36 stores the absolute minimum as the optimal solution for the function.

By now it should be appreciated that the present invention provides a method of searching for an optimal solution for a computer model. Parallel processors simultaneously work on initial estimates along various points of a function searching for a best (minimum) estimate. The processor with the smallest estimate is set to search for a local minimum in gradient mode while other processors continue operating in random mode. The dual mode of operation provides efficient searching since random mode calculations require less time. Thus, random mode searching allows further evaluations of the function while one or more processors go off in gradient mode to check out a potential optimal solution. Once the gradient mode processor finds the local minimum, it is stored and the other processors are checked for better solution. If no better solutions are found after numerous iterations, the smallest stored local minimum is declared as the optimal solution.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A computer implemented method of determining parameter values of a circuit model, comprising the steps of:
    (a) initializing a plurality of processors with initial estimates of the parameter values of the circuit model;
    (b) evaluating initial estimates within a plurality of processors respectively to determine a plurality of solutions;
    (c) selecting a best estimate of the parameter values of the circuit model from said plurality of solutions;
    (d) setting at least one of said plurality of processors having said best estimate to run in gradient mode while setting others of said plurality of processors to run in random mode; and
    (e) evaluating estimates of the parameter values of the circuit model from said plurality of processors running in random mode until said at least one of said plurality of processors running in gradient mode determines a local minimum.

2. The method of claim 1 further including the step of repeating steps (c) through (e) until an optimal solution of the parameter values of the circuit model is determined as an absolute minimum value.

3. The method of claim 2 further including the step of initializing each of said plurality of processors with said initial estimates of the parameter values.

4. The method of claim 3 further including the step of storing said local minimum.

5. The method of claim 4 further including the step of setting said at least one of said plurality of processors running in gradient mode to run in random mode after finding said local minimum.

6. The method of claim 5 further including the step of taking a derivative of said estimate under evaluation by said at least one of said plurality of processors running in gradient mode to determine a slope of the parameter.

7. A computer implemented method of determining nodal voltage and currents that optimally describe electrical state of a circuit, comprising the steps of:
  (a) initializing a plurality of processors with initial estimates of the nodal voltage and currents of the circuit;
  (b) evaluating said initial estimates within each of said plurality of processors respectively to determine a plurality of solutions;
  (c) selecting a best estimate of the nodal voltages and currents from said plurality of solutions;
  (d) setting at least one of said plurality of processors having said best estimate to run in gradient mode while setting others of said plurality of processors to run in random mode; and
  (e) evaluating estimates of the nodal voltages and currents from said plurality of processors running in random mode until said at least one of said plurality of processors running in gradient mode determines a local minimum.

8. The method of claim 7 further including the step of repeating steps (c) through (e) until an optimal solution of the nodal voltage and currents is determined as the absolute minimum value.

9. The method of claim 8 further including the step of storing said local minimum.

10. The method of claim 9 further including the step of setting said at least one of said plurality of processors running in gradient mode to run in random mode after finding said local minimum.

11. The method of claim 10 further including the step of taking a derivative of said estimate under evaluation by said at least one of said plurality of processors running in gradient mode to determine a slope of the nodal voltage and currents.

12. A computer implemented method of determining model parameter values that optimally describe a transistor circuit, comprising the steps of:
  (a) initializing a plurality of processors with initial estimates of the model parameter values of the transistor circuit;
  (b) evaluating initial estimates within a plurality of processors respectfully to determine a plurality of solutions;
  (c) selecting a best estimate of the model parameter values of the transistor circuit from said plurality of solutions;
  (d) setting at least one of said plurality of processors having said best estimate to run in gradient mode while setting others of said plurality of processors to run in random mode;
  (e) evaluating estimates of the model parameter values of the transistor circuit from said plurality of processors running in random mode until said at least one of said plurality of processors running in gradient mode determines a local minimum; and
  (f) repeating steps (c) through (e) until an optimal solution of the model parameter values of the transistor circuit is determined as an absolute minimum value.

13. The method of claim 12 further including the step of initializing each of said plurality of processors with said initial estimates of the model parameter values of the transistor circuit.

14. The method of claim 13 further including the step of storing said local minimum.

15. The method of claim 14 further including the step of setting said at least one of said plurality of processors running in gradient mode to run in random mode after finding said local minimum.

16. The method of claim 15 further including the step of taking a derivative of said estimate under evaluation by said at least one of said plurality of processors running in gradient mode to determine a slope of the model parameter.

* * * * *